US009888495B2

(12) United States Patent
Koskela et al.

(10) Patent No.: US 9,888,495 B2
(45) Date of Patent: Feb. 6, 2018

(54) METHODS AND APPARATUSES FOR FACILITATING COMMUNICATIONS (71) Applicant: AVAGO TECHNOLOGIES GENERAL IP (SINGAPORE) PTE. LTD., Singapore (SG)

(72) Inventors: Timo Koskela, Oulu (FI); Anna Pantelidou, Oulu (FI); Sami-Jukka Hakola, Kemple (FI); Samuli Turtinen, Li (FI)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 316 days.

(21) Appl. No.: 14/133,896

(22) Filed: Dec. 19, 2013

(65) Prior Publication Data
US 2014/0177517 A1 Jun. 26, 2014

(30) Foreign Application Priority Data

Dec. 21, 2012 (GB) .................................. 1223260.9

(51) Int. Cl.
*H04L 5/00* (2006.01)
*H04B 7/14* (2006.01)
(Continued)

(52) U.S. Cl.
CPC ........ *H04W 74/04* (2013.01); *H04B 7/15507* (2013.01); *H04B 7/15542* (2013.01); *H04W 72/042* (2013.01)

(58) Field of Classification Search
CPC ..... H04L 5/0037; H04B 7/14; H04B 7/15507; H04B 7/15542; H04W 74/04; H04W 72/042; Y02B 60/50
See application file for complete search history.

(56) References Cited

U.S. PATENT DOCUMENTS 8,219,129 B2 * 7/2012 Brown .................. H04W 12/02
370/324
2011/0274026 A1 * 11/2011 Huang ................. H04J 11/0069
370/312
(Continued)

FOREIGN PATENT DOCUMENTS

| EP | 2547008 | 1/2013 |
|----|---------|--------|
| KR | 20100091723 | 8/2010 |
| WO | 2005067173 | 7/2005 |

OTHER PUBLICATIONS

IEEE 802.11-12/1158r0; section 4.2.1 Uplink Channel Access including revision R4.2.L (IEEE 802.11ah specification frame work document; Sep. 2012; p. 23).

*Primary Examiner* — Noel Beharry
*Assistant Examiner* — Ruihua Zhang
(74) *Attorney, Agent, or Firm* — Oblon, McClelland, Maier & Neustadt, L.L.P.

(57) ABSTRACT

A method, apparatus and computer program product are provided for scheduling or assigning a transmission opportunity. A method and apparatus may assign a relay transmission opportunity to at least one intermediate node designating a resource, among a plurality of resources, of a scheduled transmission opportunity of a signal. The intermediate node is assigned to communicate with at least one designated station during the designated time period. The method and apparatus may broadcast information of the signal to enable the designated station to detect data of the signal indicating that the station is assigned to communicate with the intermediate node during the designated resource of the scheduled transmission opportunity.

20 Claims, 8 Drawing Sheets (51) Int. Cl.
*H04W 74/04* (2009.01)
*H04B 7/155* (2006.01)
*H04W 72/04* (2009.01)

(56) References Cited

U.S. PATENT DOCUMENTS

| | | | | |
|---|---|---|---|---|
| 2013/0034045 A1* | 2/2013 | Kwon | ................. | H04L 41/12 370/315 |
| 2013/0343350 A1* | 12/2013 | Weinrib | ............... | H04B 7/2643 370/336 |
| 2014/0126461 A1* | 5/2014 | Ghosh | ................. | H04W 88/04 370/315 |

* cited by examiner

METHODS AND APPARATUSES FOR FACILITATING COMMUNICATIONS

TECHNICAL FIELD

Embodiments of the present invention relate generally to wireless communications technology and, more particularly, to a method and apparatus for facilitating communications between communication devices and intermediate nodes during a scheduled transmission opportunity.

BACKGROUND

Currently, access points (APs) are capable of supporting a large number of associated stations (STAs) (e.g., over 6,000 STAs) which may operate on a very strict energy budget. Such devices may be, for example, battery powered sensors which transmit and receive data very rarely and which stay in the low power operation mode for relatively long periods of time. The basic operation mode of an AP operating according to the Institute of Electrical and Electronics Engineers (IEEE) 802.11 standard is the Distributed Coordination Function (DCF) mode. In order to support such a large number of STAs operating in random access mode, an access point(s) may utilize specific techniques to restrict the contention to a channel to avoid collisions of simultaneous transmissions in the collision domain. One such technique to reduce contention and collisions of transmission is a method of grouping STAs to multiple groups and assign certain parameters for each group to indicate the specific group that may access (e.g., content for) the channel. Such grouping information and parameters for the operation may be delivered to the STAs in an association phase or for example in the broadcast information such as beacons.

To further enhance the energy saving of the STAs, a system may incorporate a so-called relay functionality in which intermediate nodes (e.g., relays) may be utilized to receive and forward transmission of STAs. STAs may use lower transmission power to reach the intermediate nodes which may then forward the transmissions to a destination node. Although this may increase the energy consumption of the intermediate node, the intermediate node(s) is usually not energy limited. For example, an intermediate node(s) may be connected to a power supply. Some intermediate nodes such as, for example, relays may be battery powered but it is typically easier to replace the battery of relays instead of the batteries of, for example, several hundred devices (e.g., STAs).

In the IEEE 802.11ah and in the IEEE 802.11 protocols, relays may be used to improve energy consumption and potentially coverage, and specific mechanisms may be used to ensure that relays and STAs have a common understanding as to the manner in which to operate. STAs may spend most of the time in the low power state and as such the relay operation should take this into account.

SUMMARY

A method, apparatus and computer program product are therefore provided according to an example embodiment in order to provide an efficient and reliable manner for scheduling or assigning a relay transmission opportunity in a communications system.

The example embodiments may assign a relay transmission opportunity to an intermediate node such as, for example, a relay by designating a time slot of a Restricted Access Window (RAW), of a beacon, to the relay and specifying that the relay communicates in the designated time slot. In some example embodiments, the relay may be assigned, by an access point, to communicate with a designated station during the time slot. In other example embodiments, the relay may be assigned, by an access point, to communicate with multiple stations (e.g., a group of stations) during the designated time slot of the RAW. In another example embodiment, a relay transmission opportunity may be assigned for multiple relays to communicate (e.g., communicate with stations, access points, etc.) during a designated time slot of a RAW.

By assigning a time slot of a RAW for a relay(s) to communicate during a time period of the time slot, exemplary embodiments may reduce power consumption on stations communicating with the relay(s). As such, example embodiments may provide a mechanism for relays to communicate with stations in an energy efficient manner. By providing a procedure to enhance relay operation during a transmission opportunity, the example embodiments may provide a transmission procedure for stations operating in a relay mode.

In one example embodiment, a method is provided that includes assigning a relay transmission opportunity to at least one intermediate node designating a resource, among a plurality of resources, of a scheduled transmission opportunity of a signal. The intermediate node is assigned to communicate with at least one designated station during the designated resource. The method of this embodiment also causes broadcasting of information of the signal to enable the designated station to detect data of the signal indicating that the station is assigned to communicate with the intermediate node during the designated resource of the scheduled transmission opportunity.

In another example embodiment, an apparatus is provided that includes a processing system, which may be embodied by at least one processor and at least one memory including computer program code. The processing system is arranged to cause the apparatus to at least assign a relay transmission opportunity to at least one intermediate node designating a resource, among a plurality of resources, of a scheduled transmission opportunity of a signal. The intermediate node is assigned to communicate with at least one designated station during the designated resource. The processing system is also arranged to cause the apparatus to cause broadcast of information of the signal to enable the designated station to detect data of the signal indicating that the station is assigned to communicate with the intermediate node during the designated resource of the scheduled transmission opportunity.

In yet another example embodiment, a computer program product is provided that includes at least one non-transitory computer-readable storage medium having computer-readable program instructions stored therein with the computer-readable program instructions including program instructions configured to assign a relay transmission opportunity to at least one intermediate node designating a resource, among a plurality of resources, of a scheduled transmission opportunity of a signal. The intermediate node is assigned to communicate with at least one designated station during the designated resource. The computer-readable program instructions of this embodiment also include program instructions configured to cause broadcasting of information of the signal to enable the designated station to detect data of the signal indicating that the station is assigned to communicate with the intermediate node during the designated resource of the scheduled transmission opportunity.

In a further example embodiment, an apparatus is provided that includes means for assigning a relay transmission opportunity to at least one intermediate node designating a resource, among a plurality of resources, of a scheduled transmission opportunity of a signal. The intermediate node is assigned to communicate with at least one designated station during the designated resource. The apparatus of this embodiment also includes means for causing broadcasting of information of the signal to enable the designated station to detect data of the signal indicating that the station is assigned to communicate with the intermediate node during the designated resource of the scheduled transmission opportunity.

In yet another example embodiment, method is provided that includes detecting an assigned relay transmit opportunity designating a resource, among a plurality of resources, of a scheduled transmission opportunity of a broadcast signal in which to communicate with at least one designated station. The method of this embodiment also facilitates communications with the designated station during a time period of the designated resource of the scheduled transmission opportunity.

In another example embodiment, an apparatus is provided that includes a processing system, which may be embodied by at least one processor and at least on memory including computer program code. The processing system is arranged to cause the apparatus to at least detect an assigned relay transmit opportunity designating a resource, among a plurality of resources, of a scheduled transmission opportunity of a broadcast signal in which to communicate with at least one designated station. The processing system is arranged to cause the apparatus to facilitate communications with the designated station during a time period of the designated resource of the scheduled transmission opportunity.

In a further example embodiment, a computer program product is provided that includes at least one non-transitory computer-readable storage medium having computer-readable program instructions stored therein with the computer-readable program instructions including program instructions configured to detect an assigned relay transmit opportunity designating a resource, among a plurality of resources, of a scheduled transmission opportunity of a broadcast signal in which to communicate with at least one designated station. The computer-readable program instructions of this embodiment also include program instructions configured to facilitate communications with the designated station during a time period of the designated resource of the scheduled transmission opportunity.

In another example embodiment, an apparatus is provided that includes means for detecting an assigned relay transmit opportunity designating a resource, among a plurality of resources, of a scheduled transmission opportunity of a broadcast signal in which to communicate with at least one designated station. The apparatus of this embodiment also includes means for facilitating communications with the designated station during a time period of the resource of the scheduled transmission opportunity. In yet another example embodiment, a method is provided that includes detecting an assigned relay transmit opportunity designating a resource, among a plurality of resources, of a scheduled transmission opportunity of a broadcast signal in which to communicate with at least one intermediate node. The method of this embodiment also facilitates communications with the intermediate node during a time period of the designated resource of the scheduled transmission opportunity.

In another example embodiment, an apparatus is provided that includes a processing system, which may be embodied by at least one processor and at least on memory including computer program code. The processing system is arranged to cause the apparatus to detect an assigned relay transmit opportunity designating a resource, among a plurality of resources, of a scheduled transmission opportunity of a broadcast signal in which to communicate with at least one intermediate node. The processing system is arranged to cause the apparatus to facilitate communications with the intermediate node during a time period of the designated resource of the scheduled transmission opportunity.

In a further example embodiment, a computer program product is provided that includes at least one non-transitory computer-readable storage medium having computer-readable program instructions stored therein with the computer-readable program instructions including program instructions configured to detect an assigned relay transmit opportunity designating a resource, among a plurality of resources, of a scheduled transmission opportunity of a broadcast signal in which to communicate with at least one intermediate node. The computer-readable program instructions of this embodiment also include program instructions configured to facilitate communications with the intermediate node during a time period of the designated resource of the scheduled transmission opportunity.

In another example embodiment, an apparatus is provided that includes means for detecting an assigned relay transmit opportunity designating a resource, among a plurality of resources, of a scheduled transmission opportunity of a broadcast signal in which to communicate with at least one intermediate node. The apparatus of this embodiment also includes means for facilitating communications with the intermediate node during a time period of the designated resource of the scheduled transmission opportunity.

BRIEF DESCRIPTION OF THE DRAWINGS

Having thus described some embodiments of the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, a transmission opportunity or a relay transmission opportunity may denote a specific time period that a communication device such as, for example, a station(s) and/or an intermediate node(s) (e.g., a relay(s)) is assigned to communicate data.

In order to restrict the contention to a channel to avoid collisions of simultaneous transmissions, existing solutions such as, for example, the IEEE 802.11ah protocol may spread out uplink transmissions from stations to access points to minimize the impact of the transmissions to the access points colliding. In this regard, existing solutions of the IEEE 802.11ah protocol may utilize Restricted Access Windows (RAWs) which include time slots in a time domain schedule. For instance, an access point may assign times to certain time slots of a Restricted Access Window for a station(s) to communicate with an access point across a channel. In other words, a Restricted Access Window may have different time slots in which one or more stations are assigned to communicate with an access point via a channel.

The RAW access procedure in existing solutions such as, for example, the IEEE 802.11ah protocol is typically as follows. A Restricted Access Window is divided in time slots. A STA may wake up at a Target Beacon Transmit Time (TBTT) and the STA may listen to a Beacon frame that indicates the slot duration for each Restricted Access Window. A slot duration for each RAW may be different and a STA may determine its channel access slot assigned by an access point. A STA may sleep before its channel access slot. A STA may start to access the channel at the slot boundary of its channel access slot based on an Enhanced Distributed Channel Access (EDCA).

An access point may indicate whether transmission opportunity (TXOP) rule is applied in each RAW. The TXOP may indicate that a STA(s) is assigned to transmit in an assigned time slot. A TXOP or transmission within a TXOP may not extend across a slot boundary. If the TXOP rule is applied, the STA may not wait for a Probe Delay when waking up at the slot boundary.

Although existing solutions such as, for example, the IEEE 802.11ah protocol provides a mechanism for stations to communicate directly with access points to minimize collisions across a channel, existing solutions typically do not provide a manner in which an intermediate node(s) such as, for example, a relay(s) may be assigned to one or more time slots of a Restricted Access Window of a beacon to facilitate communications between communication devices (e.g., a station(s), a relay(s), an access point(s), etc.).

As such, it may be beneficial to provide a mechanism to assign relays to time slots of a Restricted Access Window to enhance energy efficiency of STAs since it typically takes less power for a STA(s) to communicate with a relay than it does to communicate with an access point.

Figure 1:
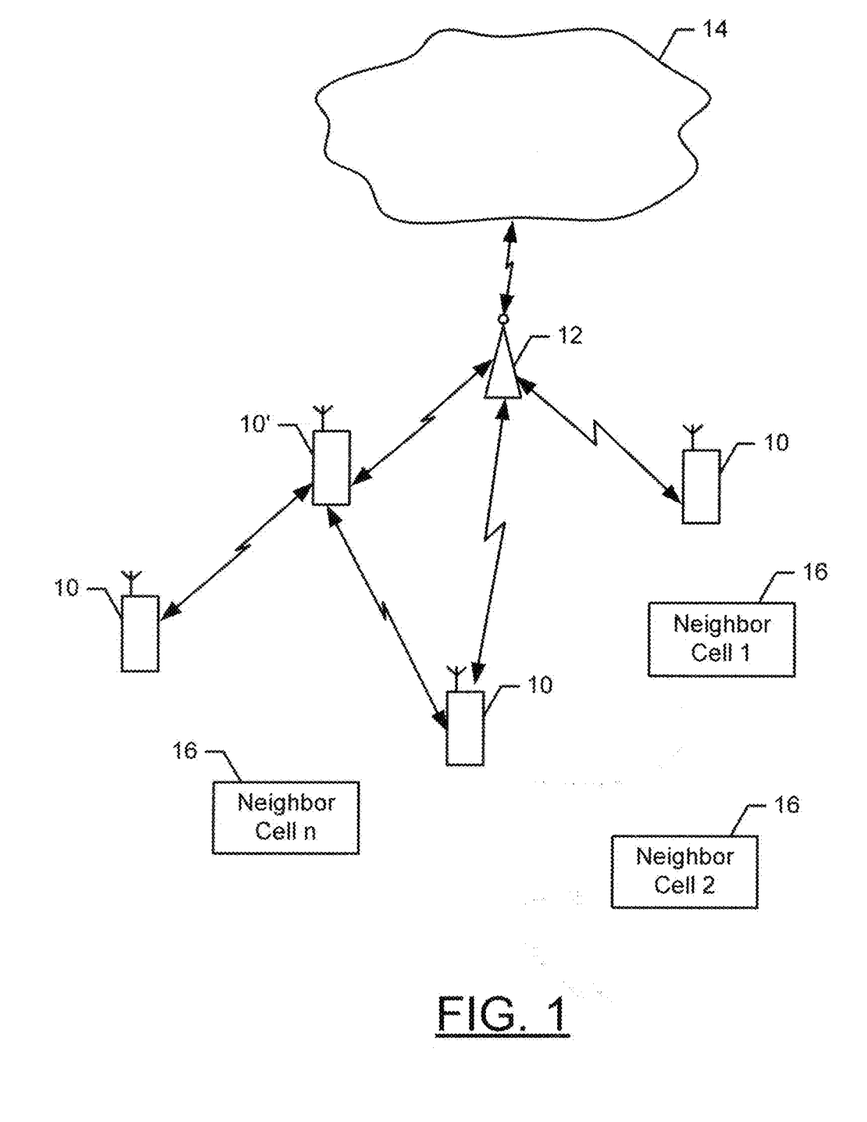
FIG. 1 is a schematic representation of a system that may benefit from an example embodiment.

Referring now to FIG. 1, a system according to an example embodiment is provided. The system of FIG. 1 includes a first communication device (e.g., mobile terminal 10) that is capable of communication via a serving cell 12, such as a base station, a Node B, an evolved Node B (eNB), a radio network controller (RNC), an access point (AP), with a network 14 (e.g., a core network). While the network may be configured in accordance with Universal Mobile Telecommunications System (UMTS), Long Term Evolution (LTE™) or LTE-Advanced (LTE-A™), other networks may support the method, apparatus and computer program product of embodiments of the present invention including those configured in accordance with wideband code division multiple access (W-CDMA), CDMA2000, global system for mobile communications (GSM), general packet radio service (GPRS), a IEEE 802.11 system, a IEEE 802.11ah system, and/or the like.

The network 14 may include a collection of various different nodes, devices or functions that may be in communication with each other via corresponding wired and/or wireless interfaces. For example, the network may include one or more cells, including serving cell 12 and one or more neighbor cells 16 (designated neighbor cell 1, neighbor cell 2, . . . neighbor cell n in the embodiment of FIG. 1), each of which may serve a respective coverage area. The serving cell and the neighbor cells could be, for example, part of one or more cellular or mobile networks or public land mobile networks (PLMNs). In turn, other devices such as processing devices (e.g., personal computers, server computers or the like) may be coupled to the mobile terminal 10 and/or other communication devices via the network.

For example, the mobile terminals 10 may communicate with one or more mobile terminals 10' which may be an intermediate node(s) (e.g., a relay device (also referred to herein as relay)). In this regard, the mobile terminal(s) 10' may facilitate communications between the serving cell 12 (also referred to herein as AP 12) and mobile terminals 10 (also referred to herein as stations). In other words, the mobile terminal 10' may operate in a relay mode as an intermediate node that is configured to receive data from and transmit data to other communication devices (e.g., mobile terminals 10, APs 12, neighbor cells 16 (also referred to herein as neighbor APs 16). The mobile terminal 10 may operate as a station (e.g., a Wi-Fi station, a WLAN station) that is configured to transmit data to and receive data from a mobile terminal 10' that operates in a relay mode and may also be configured to communicate directly with an AP (e.g., AP(s) 12, neighbor AP(s) 16).

A communication device, such as the mobile terminal 10 and mobile terminal 10' (also referred to herein as User Equipment (UE) 10, UE 10'), may be in communication with other communication devices or other devices via the serving cell 12 and, in turn, the network 14. In some cases, the communication device may include an antenna for transmitting signals to and for receiving signals from a serving cell.

In some example embodiments, the mobile terminal 10 and/or mobile terminal 10' may be a mobile communication device(s) such as, for example, a mobile telephone, portable digital assistant (PDA), pager, laptop computer, or any of numerous other hand held or portable communication devices, computation devices, content generation devices, content consumption devices, sensors (e.g., gas meters, temperature meters, electricity meters, etc.), or combinations thereof. As such, the mobile terminal 10 and mobile terminal 10' may include one or more processors that may define processing circuitry either alone or in combination with one or more memories. The processing circuitry may utilize instructions stored in the memory to cause the mobile terminal 10 and/or mobile terminal 10' to operate in a particular way or execute specific functionality when the instructions are executed by the one or more processors. The mobile terminal 10 and mobile terminal 10' may also include communication circuitry and corresponding hardware/software to enable communication with other devices and/or the network 14.

Figure 2:
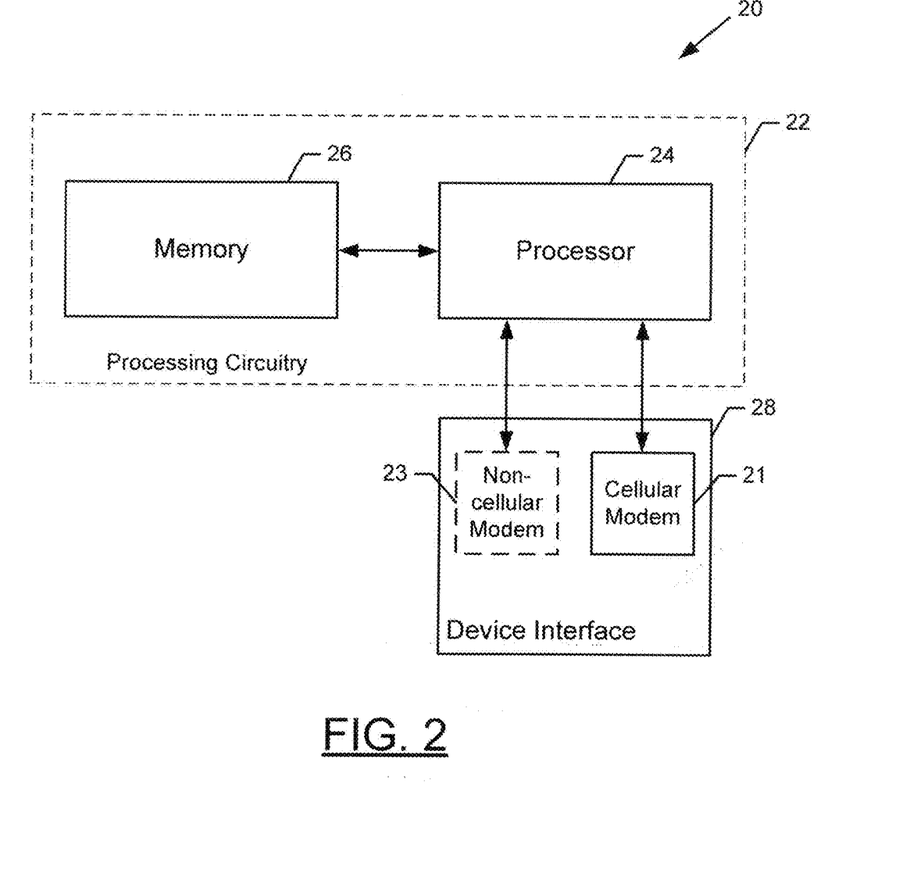
FIG. 2 is a schematic block diagram of an apparatus from the perspective of an access point in accordance with an example embodiment.

In one embodiment, for example, a neighbor AP 16 and/or the AP 12 may be embodied as or otherwise include an apparatus 20 as generically represented by the block diagram of FIG. 2. In an example embodiment, the AP 12 and/or the neighbor AP 16 may be, for example, a Wi-Fi AP, a WLAN AP or the like. Additionally, in one example embodiment, the mobile terminal 10 and mobile terminal 10' may be embodied as or otherwise include an apparatus 30 as generically represented by the block diagram of FIG. 3. While the apparatus 20 may be employed, for example, by an AP 12, or a neighbor AP 16 and the apparatus 30 may be employed, for example, by a mobile terminal 10 or an mobile terminal 10', it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with a processing system including, for example, processing circuitry 22 that is configurable to perform actions in accordance with example embodiments described herein. The processing circuitry may be configured to perform data processing, application execution and/or other processing and management services according to an example embodiment of the invention. In some example embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 26 that may be in communication with or otherwise control a device interface 28. As such, the processing circuitry may be embodied as a circuit chip (e.g., an integrated circuit chip) configured (e.g., with hardware, software or a combination of hardware and software) to perform operations described herein in relation to the apparatus 20. In an alternative example embodiment, the processing circuitry 22 may be embodied in a modem (e.g., cellular modem 21).

The device interface 28 may include one or more interface mechanisms for enabling communication with other devices, such as one or more mobile terminals 10 and/or mobile terminals 10'. In some cases, the device interface may be any means such as a device or circuitry embodied in either hardware, or a combination of hardware and software that is configured to receive and/or transmit data from/to a network and/or any other device or module in communication with the processing circuitry 22. In this regard, the device interface may include, for example, an antenna (or multiple antennas) and supporting hardware and/or software for enabling communications with a wireless communication network and/or a communication modem, such as a cellular modem 21 (e.g., a UMTS modem, a LTE modem, etc.), and/or an optional non-cellular modem 23 (e.g., a Wi-Fi modem, WLAN modem, etc.) for enabling communications with other terminals (e.g., Wi-Fi terminals, WLAN terminals, other APs, etc).

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Figure 3:
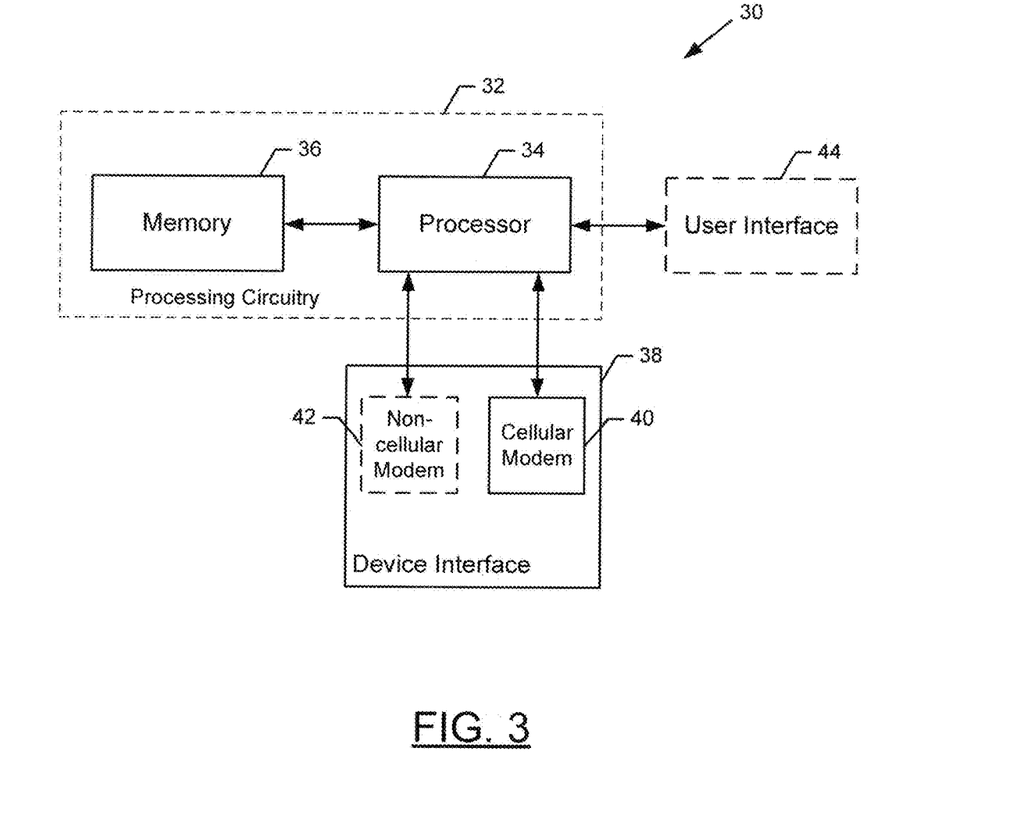
FIG. 3 is a block diagram of an apparatus that may be embodied by a mobile terminal in accordance with an example embodiment.

In one embodiment, the mobile terminals 10 and/or mobile terminals 10' may be embodied as or otherwise include an apparatus 30 as generically represented by the block diagram of FIG. 3. In this regard, the apparatus may be configured to provide for communications with the AP 12 or another terminal(s) via communications system (e.g., a Wi-Fi system, a WLAN system). While the apparatus may be employed, for example, by a mobile terminal, it should be noted that the components, devices or elements described below may not be mandatory and thus some may be omitted in certain embodiments. Additionally, some embodiments may include further or different components, devices or elements beyond those shown and described herein. As shown in FIG. 3, the apparatus 30 may include or otherwise be in communication with a processing system including, for example, processing circuitry 32 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 32 may include a processor 34 and memory 36 that may be in communication with or otherwise control a device interface 38 and, in some cases, a user interface 44. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal, the processing circuitry may be embodied as a portion of a User Equipment (UE) or other mobile terminal. In an alternative example embodiment, the processing circuitry 32 may be embodied in a modem (e.g., cellular modem 40).

The optional user interface 44 may be in communication with the processing circuitry 32 to receive an indication of a user input at the user interface and/or to provide an audible, visual, mechanical or other output to the user. As such, the user interface in the context of a mobile terminal may include, for example, a keyboard, a mouse, a joystick, a display, a touch screen, a microphone, a speaker, and/or other input/output mechanisms.

The device interface 38 may include one or more interface mechanisms for enabling communication with other devices and/or networks. In some cases, the device interface may be any means such as a device or circuitry embodied in either hardware, or a combination of hardware and software that is configured to receive and/or transmit data from/to a network and/or any other device or module in communication with the processing circuitry 32. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In the illustrated embodiment, for example, the device interface includes a cellular modem 40 (e.g., a UMTS modem, a LTE modem, etc.) for supporting communications with the Node B 12 and an optional non-cellular modem 42 (e.g., a Wi-Fi modem, WLAN modem, Bluetooth (BT) modem, etc.) for supporting communications with other terminals (e.g., a Wi-Fi station(s), a WLAN station(s)), etc.).

In an example embodiment, the memory 36 may include one or more non-transitory memory devices such as, for example, volatile and/or non-volatile memory that may be either fixed or removable. The memory may be configured to store information, data, applications, instructions or the like for enabling the apparatus 30 to carry out various functions in accordance with example embodiments of the present invention. For example, the memory could be configured to buffer input data for processing by the processor 34. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 34 may be embodied in a number of different ways. For example, the processor may be embodied as various processing means such as one or more of a microprocessor or other processing element, a coprocessor, a controller or various other computing or processing devices including integrated circuits such as, for example, an ASIC, an FPGA or the like. In an example embodiment, the processor may be configured to execute instructions stored in the memory 36 or otherwise accessible to the processor. As such, whether configured by hardware or by a combination of hardware and software, the processor may represent an entity (e.g., physically embodied in circuitry—in the form of processing circuitry 32) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein. In one example embodiment, the apparatus 30 may operate in a relay mode as an intermediate node (e.g., mobile terminal 10') that is configured to receive data from and transmit data to other communication devices (e.g., other apparatuses 30 (e.g., mobile terminals 10), AP 12, neighbor AP 16). In another example embodiment, the apparatus 30 may operate as a station (e.g., mobile terminal 10 (e.g., a Wi-Fi station, a WLAN station)) that is configured to transmit data to and receive data from another apparatus 30 (e.g., mobile terminal 10') operating in a relay mode and may also be configured to communicate directly with an AP (e.g., AP 12, neighbor AP 16).

Figure 4:
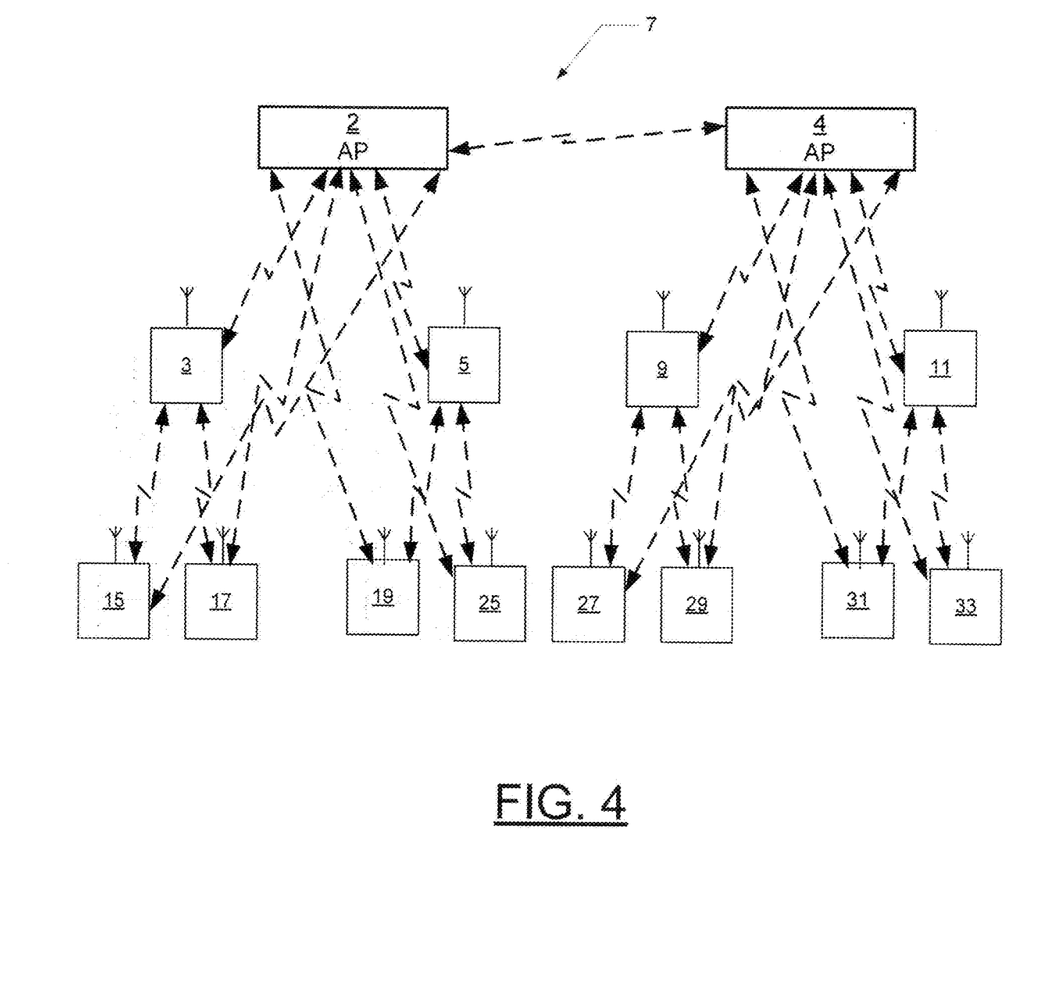
FIG. 4 is a diagram of a system in accordance with one example embodiment.

Referring now to FIG. 4, a system is provided according to an example embodiment. The system 7 may include AP 2, (e.g., AP 12), AP 4 (neighbor AP 16), intermediate nodes 3, 5, 9, 11 (also referred to herein as relays 3, 5, 9, 11) (e.g., mobile terminals 10') and STAs 15, 17, 19, 25, 27, 29, 31 and 33. Although FIG. 4 illustrates that the system 7 includes two APs 2, 4, four intermediate nodes 3, 5, 9, 11 and eight STAs 15, 17, 19, 25, 27, 29, 31 and 33, the system 7 may include any number of APs 2, 4, intermediate nodes 3, 5, 9, 11, and STAs 15, 17, 19, 25, 27, 29, 31 and 33 without departing from the spirit and scope of the invention.

The relay 3 may facilitate communications between the AP 2 and STAs 15 and 17. The relay 5 may facilitate communications between the AP 2 and STAs 19 and 25. The relay 9 may facilitate communications between AP 4 and STAs 27 and 29. Also, the relay 11 may facilitate communications between the AP 4 and STAs 31 and 33. The STAs (e.g., STAs 15, 17, 19, 25, 27, 29, 31 and 33) may communicate with corresponding relays (e.g., relays 3, 5, 9, 11) in an instance in which the STAs operate in a relay mode. When a STA(s) (e.g., STA 17, STA 29, etc.) is not operating in the relay mode, the STA(s) (e.g., STA 17, STA 29, etc.) may communicate directly with an AP(s) (e.g., AP 2, AP 4). In some example embodiments, a STA(s) may enter the relay mode to communicate with a relay to conserve power since the STA(s) may consume more power when communicating directly with an AP (e.g., the distance to the AP may be further away than the distance to the relay). In other example embodiments, a STA(s) may enter the relay mode for any suitable reason(s).

Figure 5:
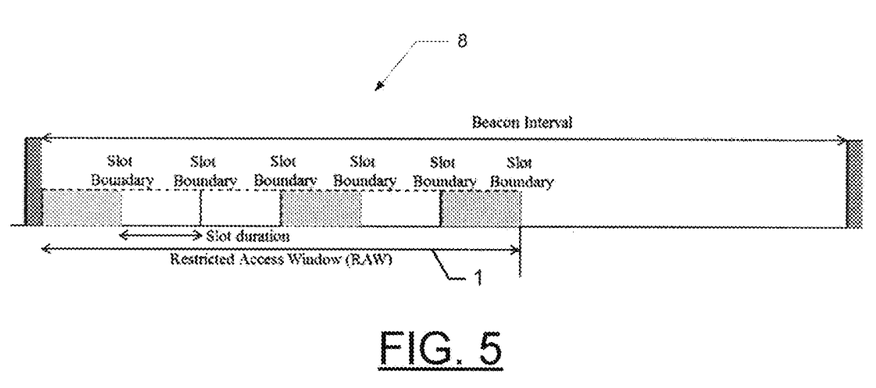
FIG. 5 is a diagram of a beacon according to an example embodiment.

Referring now to FIG. 5, a diagram of a beacon is provided according to an example embodiment. The beacon 8 may include a Restricted Access Window 1 (also referred to herein as RAW 1) that includes time slots. In the example embodiment of FIG. 5, an AP may assign a relay to communicate during a specified time slot of the RAW. In other words, an AP (e.g., AP 2) may assign a relay TXOP (R-TXOP) to a relay (e.g., relay 3) to enable the relay to transmit data to and receive data from a STA (e.g., STA 15) as well as transmit data to and receive data from the AP (e.g., AP 2) during the assigned time slot of the RAW 1. Additionally, in another example embodiment, an AP (e.g., AP 2) may assign a relay (e.g., relay 3) to communicate with multiple STAs (e.g., STAs 15, 17, etc.) during an assigned time slot of a RAW (e.g., RAW 1) of a beacon (e.g., beacon 8). The relay AID may be included in the beacon (e.g., beacon 8) that is transmitted by an AP (e.g., AP 2) and detected by a corresponding relay(s) (e.g., relay 3) and STA(s) (e.g., STA 15) of a system (e.g., system 7).

The processor (e.g., processor 24) of the AP (e.g., AP 2) may indicate the R-TXOP by assigning the TXOP to an association identifier (AID) of a relay (e.g., relay 3). STAs (e.g., STAs 15, 17, 19, 25, 27, 29, 31 and 33) which may be in relay mode may monitor the relay AID for the TXOP. In this regard, a STA(s) may monitor a beacon (e.g., beacon 8) which may include a relay AID(s) denoting a time slot of a RAW (e.g., RAW 1) that the corresponding relay (e.g., relay 3) is assigned to and in which the STA may be designated by the AP to utilize. In response to detecting the relay AID, the STA (e.g., STA 15) may communicate with the corresponding relay (e.g., relay 3) during the time slot of the RAW. In this regard, during the R-TXOP, a designated STA(s) (e.g., STA 15) may transmit and receive frames to/from a relay (e.g., relay 3) associated with the relay AID in the assigned time slot of the RAW. In one example embodiment, the processor (e.g., processor 24) of an AP (e.g., AP 4) may assign a relay AID, of a corresponding relay (e.g., relay 9), as a group AID. In other example embodiments the group AID may include the relay AID of a corresponding relay and an indication(s) of the group of STAs. As such, the group AID may be assigned by a processor (e.g., processor 24) of the AP (e.g., AP 4) denoting multiple designated STAs, or designated STAs of a group, that are assigned to communicate with a corresponding relay (e.g., relay 9) during a time slot of a RAW (e.g., RAW 1). The group AID may be included in a beacon (e.g., beacon 8) that is transmitted by the AP (e.g., AP 4) and detected by a corresponding relay(s) and group of STAs (e.g., STAs 27, 29) of a system (e.g., system 7).

In an instance in which the designated STAs (e.g., STAs 27, 29) of the group may detect the group AID, the STAs (e.g., STAs 27, 29) of the group may communicate with the corresponding relay (e.g., relay 3). For purposes of illustration and not of limitation, an AP may have some broadcast information or multicast traffic data that the AP desires to be transmitted to a group of STAs. In this regard, the AP (e.g., AP 4) may assign the relay AID of a corresponding relay as a group AID denoting to the relay (e.g., relay 9) and denoting to the group of STAs to communicate with each other during a designated time slot of a RAW. In this regard, the relay (e.g., relay 9) may communicate the broadcast information or multicast traffic data to the STAs (e.g., STAs 27, 29) of the group on behalf of the AP (e.g., AP 4).

In an instance in which a STA(s) (e.g., STA 17, STA 29) is not operating in relay mode, the STA may ignore a relay AID. In one example embodiment, even in an instance in which a STA(s) is not in relay mode the STA(s) may still receive data in response to detecting a group AID corresponding to a group of STAs in which the STA is assigned. For instance, an AP may include data in a beacon (e.g., beacon 8) instructing STAs of the group to enter the relay mode in response to detecting the group AID since the AP may desire to send data (e.g., management information) to the STAs of the group.

During an R-TXOP, STAs in a relay mode may detect a relay ID that STAs are assigned to and may use the TXOP during a time slot of a RAW to access a channel to communicate with the corresponding relay according to a Carrier Sense Multiple Access (CSMA) technique/procedure. For instance, by utilizing CSMA techniques, STAs of a group that are assigned to communicate with a relay (e.g., relay 9) may verify that a channel (e.g., a shared medium) to communicate with the relay is free/available and is not being utilized by another STA (e.g., STA 27) in an instance in which the respective STA (e.g., STA 29) desires to communicate with the relay during an assigned time slot of an RAW.

In one example embodiment, a processor (e.g., processor 24) of an AP (e.g., AP 4) may assign an R-TXOP for multiple relays (also referred to herein as a shared R-TXOP). In this regard, the processor (e.g., processor 24) of the AP (e.g., AP 4) may assign multiple relays (e.g., relays 3, 5, 9) to utilize the same time slot of a RAW to communicate with various respective STAs (e.g., STAs 15, 19 and 27). As such, corresponding relays and STAs may simultaneously or concurrently communicate during the assigned time slot. In this example embodiment, the simultaneous/concurrent communications may not necessarily cause interference across a channel since the relays may be physically separated (for e.g., by geographic location) such that the relays may not be at the same place/location. Based in part on the physical separation of the relays, there may not be any interference (or only a negligible amount of interference) between the relays, STAs and APs.

In one example embodiment, an AP may indicate an assigned R-TXOP for multiple relays in a traffic indication map (TIM) by assigning a respective time slot(s) of a RAW for relay AIDs (or group AIDs) corresponding to a respective group(s) of relays. As such, a STA(s) may monitor and detect a beacon (e.g., beacon 8) for its assigned relay AID (or group AID) and may communicate with a corresponding relay (e.g., relay 3) during an assigned time slot of a RAW even while other STAs (e.g., STAs 19, 27) communicate with other relays (e.g., relays 5, 9) designated to share the same time slot of the RAW (e.g., RAW 1). In one example embodiment, a processor (e.g., processor 24) of an AP (e.g., AP 3) may analyze data (e.g., data indicating geographical locations of the relays) and determine that a group of relays designated to share a time slot of a RAW does not cause interference (or causes a negligible amount of interference) even in an instance in which the relays are active to use a same time slot at the same time. As such, even in an instance in which multiple relays are indicated (e.g., in beacon 8) to have or share a concurrent TXOP, the STAs and relays (of the shared group of relays) may access a communication channel during the TXOP.

In one example embodiment, in an instance in which a processor of an AP (e.g., AP 2) indicates multiple relay AIDs are assigned to a group but only indicates, for example, one time slot of a RAW, this may denote an implicit indication of a shared R-TXOP to corresponding relays (e.g., relays 3, 5, 9 and 11) and STAs (e.g., STAs 15, 17, 19, 25, 27, 29, 31, 33).

In another example embodiment, an AP (e.g., AP 2) may explicitly indicate a shared R-TXOP by setting a bit in a RAW parameter(s) of a beacon (e.g., beacon 8). In one example embodiment, during a shared R-TXOP, relays sharing a time slot of a RAW may only transmit to STAs and the STAs may only transmit to the respective relays to prevent collisions and contention. As such, in this instance, relays of the shared R-TXOP may not necessarily transmit data to APs during the assigned time slot of the RAW.

In one example embodiment, a processor (e.g., processor 24) of an AP may restrict or designate a TXOP as a downlink direction or as an uplink direction. In an instance in which a processor (e.g., processor 24) of an AP(s) designates a TXOP as a downlink direction communication, an AP(s) may transmit data to a relay(s) and the relay may transmit data to a STA(s). In this regard, a relay(s) may receive data from an AP(s) and a STA(s) may receive data from a relay(s) in the downlink direction. On the other hand, in an instance in which a processor (e.g., processor 24) of an AP(s) designates a TXOP for a downlink only communication, STAs may not necessarily be able to transmit any uplink data to a relay(s). However, a STA(s) may be able to monitor for transmissions or communications from a relay(s).

In an instance in which a processor (e.g., processor 24) of an AP(s) designates a TXOP as an uplink direction, a STA(s) may transmit data to a relay(s) and a relay(s) may transmit data to an AP(s). In the uplink direction designated for the TXOP by an AP, a relay may not necessarily forward any data (e.g., frames) to a STA(s). On the other hand, a relay(s) may forward uplink data, received from a STA(s), to an AP(s). In an example embodiment, the processor (e.g., processor 24) of an AP may include an indication of a designation of the TXOP as a downlink direction only or an uplink direction only in a TXOP grant. The TXOP grant may be indicated, by the processor of the AP, in a beacon (e.g., beacon 8).

In another example embodiment, a relay(s) and/or an AP(s) may use a higher priority access for a multiuser-aggregated-Media Access Control (MAC) Protocol Data Unit (MPDU) during an R-TXOP. In this regard, for example, in an instance in which a relay(s) (e.g., relay 3) receives items of data such as, for example, multiple packets (e.g., two or more packets) from at least two STA(s) (e.g., STAs 15, 17 of a group), the relay(s) may aggregate or combine the packets into a single packet and may include the single packet (e.g., the aggregated packets) in a MPDU. The relay(s) (e.g., relay 3) may send the MPDU to an AP(s) (e.g., AP 2) and the AP(s) may use a higher priority access to process the MPDU with a higher priority than other data since the MPDU includes data from at least two STAs, in this example.

In an instance in which a single STA (e.g., STA 19) transmits multiple packets in a MPDU to a relay(s) (e.g., relay 5) the relay(s) may use or process the MDPU with a normal priority based on Enhanced Distributed Channel Access (EDCA) classes since the MDPU includes data from a single STA. In one example embodiment, an AP may assign a new priority class for a multiuse-aggregated-MPDU.

In another example embodiment, a relay may truncate an R-TXOP in an instance in which there are no more frames received in an assigned time slot of a RAW. For example, in an instance in which a relay (e.g., relay 11) receives each sent frame(s) from a STA(s) (e.g., STA 33) (e.g., communication is complete) prior to the expiration of a time period of an assigned time slot of a RAW, the relay may inform a corresponding AP (e.g., AP 4) that the remaining time of the time slot is free/available for use by another device (e.g., relay). In this regard, the processor of the AP may, but need not, assign the remaining time of an assigned time slot of a RAW to another device (e.g., a relay).

In an instance in which a processor (e.g., processor 24) of an AP (e.g., AP 4) assigned an R-TXOP for multiple relays (e.g., relays 9, 11) for a shared R-TXOP, a relay (e.g., relay 9) of a group of relays that receives each sent frame(s) (e.g., communication is complete) prior to the expiration of a time slot of a RAW may transmit a TXOP end frame to an AP. The TXOP end frame may indicate or denote that the time slot is assigned for multiple relays or shared relays. As such, the AP (e.g., AP 4) may not allocate the assigned time slot of the RAW to relays (e.g., relay 3) other than the relays of the shared group (e.g., relays 9, 11) since a relay (e.g., relay 11) of the shared group (e.g., relays 9, 11) may continue to use the time slot for the duration (e.g., time period) of the time slot.

For purposes of illustration and not of limitation, consider a group of three relays (e.g., relays 5, 9, 11) and presume that one of the relays (e.g., relay 9) indicates to an AP (e.g., AP 4) that it is no longer using an assigned time slot of a RAW for communications. For example, presume that the communications with the relay are complete (e.g., completed in 50 milliseconds (ms)) before expiration of a time period associated with the time slot (e.g., a 100 ms time slot). In this example, the AP (e.g., AP 4) may not necessarily reassign the time slot to another relay (e.g., relay 3) other than the relays of the group (e.g., relays 5, 9, 11) since two of the relays (e.g., relays 5, 11) of the group may still be using the time slot for the duration (e.g., a time period (e.g., 100 ms)) of the time slot.

Additionally, in an instance in which a shared R-TXOP is assigned by an AP, and a STA receives a shared R-TXOP end frame from a relay (e.g., relay 9) denoting that the relay is no longer using an assigned time slot, the STA (e.g., STA 31) may not necessarily reset a network allocation vector (NAV). The NAV is virtual carrier sensing mechanism that may limit the need for physical carrier sensing at an air interface in order to conserve power. For instance, a frame header(s) of a NAV may include a duration field that specifies the transmission time required for the frame, in which time the communication channel may be busy. Other STAs listening to the communication channel may read the duration field and set their NAV, which is an indicator for a STA regarding how long it may need to defer from accessing the channel.

In this example, since the STA (e.g., STA 11) did not reset its NAV even though a relay (e.g., relay 9) indicated that it was no longer using an assigned time slot to communicate via the channel, the channel is not sensed as being free or available for usage by another STA(s) (e.g., STA 15). On the other hand, in an instance in which an AP (e.g., AP 4) releases the shared R-TXOP the release may reset the NAV of the STA (e.g., STA 11) such that another STA(s) (e.g., STA 15) may utilize the communication channel during the assigned time slot of a RAW in order to communicate data.

Figure 6:
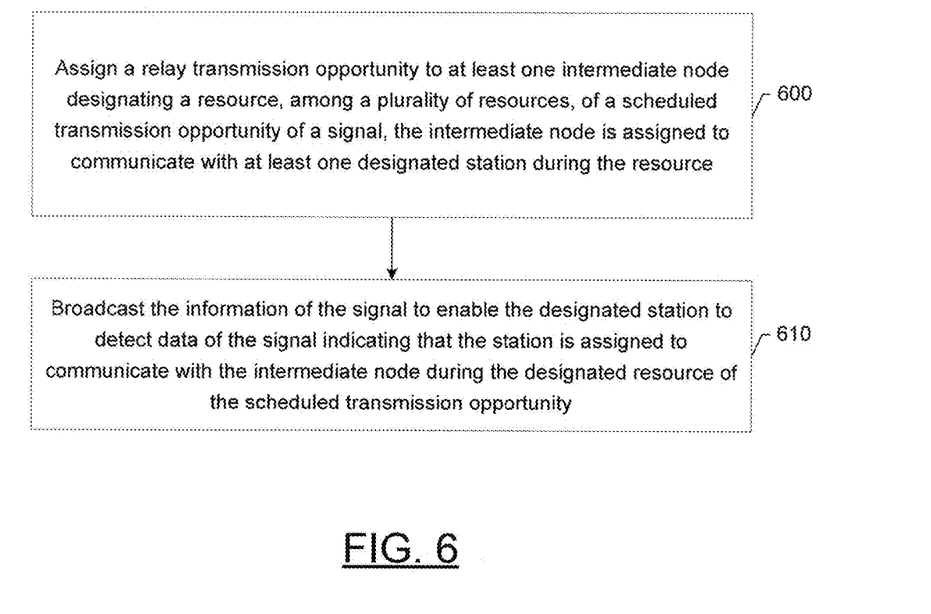
FIG. 6 is a flowchart illustrating operations performed in accordance with one example embodiment.

Referring now to FIG. 6, a flowchart is provided of an example method for scheduling or assigning a relay transmission opportunity. At operation 600, an apparatus (e.g., AP 12 (e.g., AP 2, AP 4)) may assign a relay transmission opportunity to at least one intermediate node (e.g., relay 3, relay 5 (e.g., mobile terminal 10')) designating a resource (e.g., a time slot), among a plurality of resources (e.g., time slots), of a scheduled transmission opportunity (e.g., a Restricted Access Window) (e.g., RAW 1) of a signal (e.g., a beacon (e.g., beacon 8)). The intermediate node may be assigned by the apparatus (e.g., AP 12) to communicate with at least one designated station (e.g., STA 15, STA 17 (e.g., mobile terminal 10)) during the designated resource.

Figure 7:
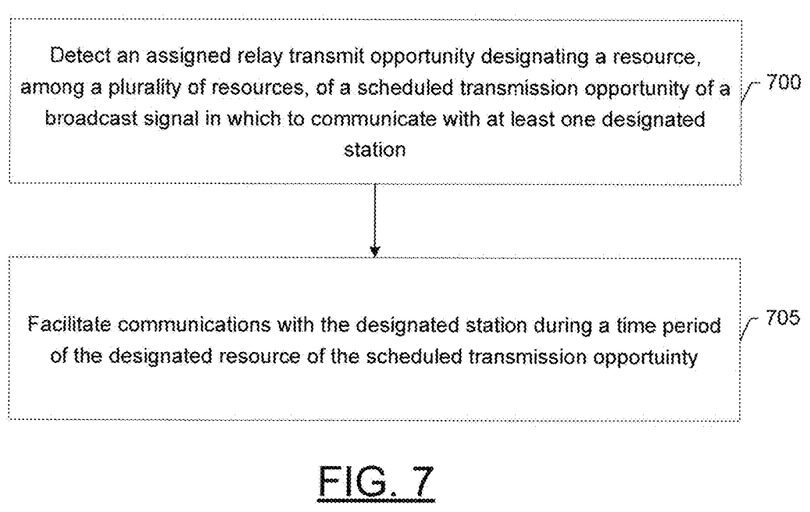
FIG. 7 is a flowchart of operations performed in accordance with another example embodiment.

At operation 610, an apparatus (e.g., AP 12) may broadcast information of the signal (e.g., beacon 8) to enable the designated station to detect data of the signal (e.g., a beacon) indicating that the station is assigned to communicate with the intermediate node (e.g., relay 3, relay 5) during the designated resource (e.g., a time slot) of the scheduled transmission opportunity (e.g., a Restricted Access Window). Referring now to FIG. 7, a flowchart is provided of an example method for detecting a relay transmission opportunity. At operation 700, an apparatus (e.g., relay 3, relay 5, relay 9, relay 11 (e.g., mobile terminal 10')) may detect an assigned relay transmit opportunity designating a resource (e.g., a time slot), among a plurality of resources (e.g., time slots), of a scheduled transmission opportunity (e.g., Restricted Access Window) (e.g., RAW 1) of a broadcast signal (e.g., a beacon (e.g., beacon 8)) in which to communicate with at least one designated station (e.g., STAs, 15, 17, 19, 25, 27, 29, 31, 33).

At operation 705, an apparatus (e.g., relay 3) may facilitate communications with the designated station (e.g., STA 15) during a time period of the designated resource (e.g., a time slot of the scheduled transmission opportunity (e.g., a Restricted Access Window (e.g., RAW 1)).

Figure 8:
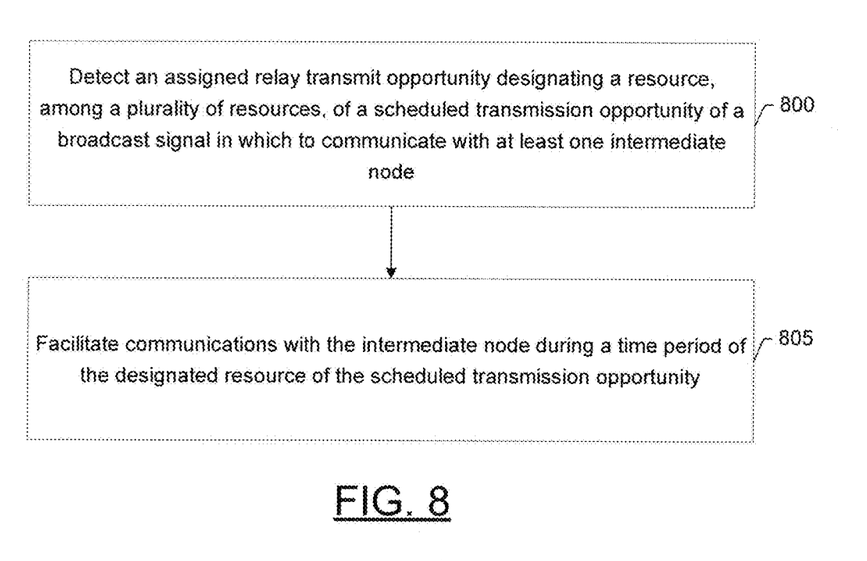
FIG. 8 is a flowchart of operations performed in accordance with yet another example embodiment.

Referring now to FIG. 8, a flowchart is provided of an example method for detecting a relay transmission opportunity. At operation 800, an apparatus (e.g., STA 15, STA 17, STA 19, STA 25, STA 27, STA 29, STA 31, STA 33 (e.g., mobile terminal 10)) may detect an assigned relay transmit opportunity designating a resource (e.g., a time slot), among a plurality of resources (e.g., time slots), of a scheduled transmission opportunity (e.g., Restricted Access Window (e.g., RAW 1)) of a broadcast signal (e.g., a beacon (e.g., beacon 8)) in which to communicate with at least one intermediate node (e.g., relay 3, 5, 9, 11).

At operation 805, an apparatus (e.g., STA 15) may facilitate communications with the intermediate node (e.g., relay 3) during a time period of the designated resource (e.g., a time slot) of the scheduled transmission opportunity (e.g., a Restricted Access Window (e.g., RAW 1)).

It should be pointed out that FIGS. 6, 7 and 8 are flowcharts of a system, method and computer program product according to an example embodiment of the invention. It will be understood that each block of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory 26, memory 36) and executed by a processor (e.g., processor 24, processor 34). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts blocks.

Accordingly, blocks of the flowcharts support combinations of means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the methods of FIGS. 6, 7 and 8 above may comprise a processor (e.g., the processor 24, processor 34) configured to perform some or each of the operations (600-605, 700-705, 800-805) described above. The processor may, for example, be configured to perform the operations (600-605, 700-705, 800-805) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (600-605, 700-705, 800-805) may comprise, for example, the processor 24 (e.g., as means for performing any of the operations described above), the processor 34 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method for assigning a transmission opportunity the method comprising:
   assigning, by a base station, a relay transmission opportunity to at least one intermediate node by designating a resource, among a plurality of resources, of a scheduled transmission opportunity of a signal that will be used as the relay transmission opportunity, the intermediate node being assigned to communicate with at least one designated station during the designated resource, the intermediate node being configured to perform communication directly with the base station, and the at least one designated station being configured to operate in one of at least two modes that include a first mode in which the designated station is configured to perform communication directly with the base station and a second mode in which the at least one designated station is configured to perform communication with the base station via the intermediate node as a relay node; and
   broadcasting, by the base station, of information of the assignment simultaneously to both the intermediate node and the at least one designated station based on the broadcasted information including at least identification information of the intermediate node, to which the at least one designated station is designated by the base station to utilize as a relay node, and an indication of the relay transmission opportunity which is a scheduled reception time period assigned to the intermediate node during a Restricted Access Window (RAW) at which the intermediate node will receive data from the at least one designated station, the Restricted Access Window being a time period during which the base station transmits and receives data directly with devices including the intermediate node, wherein
   when the at least one designated station is operating in the first mode, the at least one designated station ignores the assignment, and
   when the at least one designated node is operating in the second mode, the at least one designated station performs at least a transmission operation directly with the intermediate node during the scheduled reception time period indicated in the broadcasted information.

2. The method of claim 1, wherein:
   the resource comprises a time slot and the resources comprise a plurality of time slots;
   the scheduled transmission opportunity comprises a Restricted Access Window; and
   the signal comprises a beacon.

3. The method of claim 1, wherein the identification information of the intermediate node comprises a relay association identifier corresponding to the intermediate node.

4. The method of claim 2, further comprising:
   assigning a plurality of stations to communicate with the intermediate node during the time slot of the restricted access window.

5. The method of claim 4, further comprising:
   designating content in the beacon indicating that the stations belong to a group to communicate with the intermediate node during the time slot to enable the stations to detect the content and communicate with the intermediate node during a time period of the time slot.

6. The method of claim 1, wherein the content comprises a group association identifier corresponding to a relay association identifier of the intermediate node and indications of the stations of the group.

7. The method of claim 4, further comprising:
   enabling the stations to communicate with the intermediate node during a time period of the time slot in response to the stations accessing a channel according to a Carrier Sense Multiple Access procedure.

8. The method of claim 2, wherein assigning further comprises assigning the relay transmission opportunity to a plurality of intermediate nodes designating the intermediate nodes to share the time slot of the restricted access window to communicate with one or more respective stations.

9. The method of claim 8, wherein assigning the relay transmission opportunity to the intermediate nodes comprises assigning relay association identifiers of the intermediate nodes to the time slot.

10. The method of claim 9, wherein broadcasting the assignment further comprises enabling the respective stations to detect corresponding relay association identifiers of the intermediate nodes to enable the respective stations to communicate simultaneously with respective intermediate nodes.

11. The method of claim 8, further comprising:
    designating information in the beacon explicitly indicating that the intermediate nodes share the time slot by assigning at least one bit in at least one Restricted Access Window parameter of the beacon.

12. The method of claim 8, further comprising:
    implicitly indicating, in the beacon, that the intermediate nodes share the time slot by indicating relay association identifiers of the intermediate nodes and one time slot of the Restricted Access Window.

13. The method of claim 2, further comprising:
    designating that a communication during a time period of the time slot comprises a downlink communication in which the station receives data from the intermediate node or the intermediate node receives data from an access point.

14. The method of claim 2, further comprising:
    designating that a communication during a time period of the time slot comprises an uplink communication in which the station transmits data to the intermediate node or the intermediate node transmits data to an access point.

15. The method of claim 1, further comprising:
receiving a multiuser-aggregated media access control protocol data unit comprising aggregated items of data received from different stations; and
using a higher priority of access to process the media access control protocol data unit with a higher priority relative to at least one other item of data.

16. The method of claim 8, further comprising:
releasing the assigning of the relay transmission opportunity to the intermediate nodes which triggers at least one of the respective stations receiving a frame, indicating that at least one of the intermediate nodes is no longer communicating during the time slot, to reset a network allocation vector denoting that a channel is available for usage.

17. An apparatus for assigning a transmission opportunity, the apparatus comprising:
processing circuitry configured to:
assign a relay transmission opportunity to at least one intermediate node by designating a resource, among a plurality of resources, of a scheduled transmission opportunity of a signal that will be used as the relay transmission opportunity, the intermediate node being assigned to communicate with at least one designated station during the designated resource, the intermediate node being configured to perform communication directly with the apparatus, and the at least one designated station being configured to operate in one of at least two modes that include a first mode in which the designated station is configured to perform communication directly with the apparatus and a second mode in which the at least one designated station is configured to perform communication with the apparatus via the intermediate node as a relay node; and
broadcast of information of the assignment simultaneously to both the intermediate node and the at least one designated station based on the broadcasted information including at least identification information of the intermediate node, to which the at least one designated station is designated by the base station to utilize as a relay node, and an indication of the relay transmission opportunity which is a scheduled reception time period assigned to the intermediate node during a Restricted Access Window (RAW) at which the intermediate node will receive data from the at least one designated station, the Restricted Access Window being a time period during which the apparatus transmits and receives data directly with devices including the intermediate node, wherein
when the at least one designated station is operating in the first mode, the at least one designated station ignores the assignment, and
when the at least one designated node is operating in the second mode, the at least one designated station performs at least a transmission operation directly with the intermediate node during the scheduled reception time period indicated in the broadcasted information.

18. The apparatus of claim 17, wherein:
the resource comprises a time slot and the resources comprise a plurality of time slots;
the scheduled transmission opportunity comprises a Restricted Access Window; and
the signal comprises a beacon.

19. The apparatus of claim 18, wherein the processing system is arranged to cause the apparatus to:
assign a plurality of stations to communicate with the intermediate node during the time slot of the restricted access window.

20. A non-transitory computer readable medium for assigning a transmission opportunity, the computer readable medium comprising a set of instructions, which, when executed on an apparatus, causes the apparatus to perform the steps of:
assigning a relay transmission opportunity to at least one intermediate node by designating a resource, among a plurality of resources, of a scheduled transmission opportunity of a signal that will be used as the relay transmission opportunity, the intermediate node being assigned to communicate with at least one designated station during the designated resource, the intermediate node being configured to perform communication directly with the base station, and the at least one designated station being configured to operate in one of at least two modes that include a first mode in which the designated station is configured to perform communication directly with the base station and a second mode in which the at least one designated station is configured to perform communication with the base station via the intermediate node as a relay node; and
broadcasting of information of the assignment simultaneously to both the intermediate node and the at least one designated station based on the broadcasted information including at least identification information of the intermediate node, to which the at least one designated station is designated by the base station to utilize as a relay node, and an indication of the relay transmission opportunity which is a scheduled reception time period assigned to the intermediate node during a Restricted Access Window (RAW) at which the intermediate node will receive data from the at least one designated station, the Restricted Access Window being a time period during which the apparatus transmits and receives data directly with devices including the intermediate node, wherein
when the at least one designated station is operating in the first mode, the at least one designated station ignores the assignment, and
when the at least one designated node is operating in the second mode, the at least one designated station performs at least a transmission operation directly with the intermediate node during the scheduled reception time period indicated in the broadcasted information.

* * * * *